July 7, 1970  F. G. HAMMITT ET AL  3,519,251

VIBRATORY UNIT WITH BAFFLE

Filed July 11, 1968

INVENTORS
FREDERICK G. HAMMITT
ROBERT E. NYSTROM
BY JAMES F. LAFFERTY
ROBERT CHEESEWRIGHT

*Olsen and Stephenson*
ATTORNEYS

United States Patent Office 3,519,251
Patented July 7, 1970

3,519,251
VIBRATORY UNIT WITH BAFFLE
Frederick G. Hammitt, 1306 Olivia St. 48104; and
Robert E. Nystrom, 1844 Traver Road 48105, both
of Ann Arbor, Mich.; James F. Lafferty, 320 Greenbriar Road, Lexington, Ky. 40503, and Robert
Cheesewright, 122 Carver Hill Road, High Wycombe,
Buckingham, England
Filed July 11, 1968, Ser. No. 744,066
Int. Cl. B01f 11/02
U.S. Cl. 259—116                                4 Claims

ABSTRACT OF THE DISCLOSURE

High frequency vibratory apparatus for producing cavitation damage on workpieces mounted therein wherein a baffle is mounted so that it surrounds the workpiece and is arranged in a closely spaced relation therewith to provide for increased cavitation damage which is uniformly distributed over the exposed surface of the workpiece. The workpiece is located so that the lower surface to be damaged is located substantially in the plane of the lower surface of the baffle.

BACKGROUND OF THE INVENTION

U.S. Pat. No. 3,331,589, issued to Hammitt et al., discloses a vibratory unit for producing cavitation damage on a surface of a workpiece, particularly a test specimen formed of a material which is to be tested for its ability to resist cavitation damage. This unit includes a vibratory horn which is piezoelectrically vibrated so that a vibratory displacement of approximately two mils is produced at the lower tip of the horn. The horn extends downwardly into a container filled with a liquid and a workpiece is mounted on the horn tip. The up and down vibratory movement of the horn tip results in a rapid variation in local pressure on the lower surface of the workpiece causing the periodic formation and collapse of an intense cavitation cloud or bubble which produces the desired cavitation damage to the workpiece.

While the apparatus disclosed in the aforementioned patent is satisfactory, the damage to the workpiece surface is not spread uniformly over the surface of the workpiece which is exposed to the cavitation cloud. Irregular pitting takes place and much of the area exposed to the cavitation cloud is relatively free of cavitation damage, leading to results which tend to be relatively imprecise and not repeatable. Also, the amount of damage sustained by the workpiece is relatively slow so that the workpiece must be vibrated over a prolonged period in order to obtain substantial cavitation damage. Operation of the unit over such a prolonged period increases the costs involved in producing the desired cavitation damage.

Previous attempts to maximize the rate of damage to the workpiece and improve the uniformity of damage have involved a special workpiece configuration, which also increases test costs and makes workpiece manufacture and treatment more difficult.

It is an object of this invention, therefore, to provide improved vibratory apparatus capable of accomplishing quicker and more uniform damage to the workpiece.

SUMMARY OF THE INVENTION

The vibratory unit of this invention is similar to the unit shown in the aforementioned Hammitt et al. patent in that it utilizes a workpiece mounted on the lower end of a vibratory horn and immersed in a fluid in a container. The horn extends downwardly into the container and the workpiece is mounted on the lower end of the horn for up and down vibratory movement. A baffle plate is disposed in the container and located so that the bottom surface of the baffle plate is substantially coplanar with the bottom surface of the workpiece which is to be subjected to the cavitation cloud. The baffle plate has an opening in which the workpiece is positioned, and the boundaries of the workpiece surface to be damaged are closely spaced from the inner edges of the baffle opening. As a result, it has been found that the rate of cavitation damage obtainable on the workpiece surface exposed to the cavitation cloud is substantially increased, and a more uniform damage pattern is obtained so that test results can be more precisely reproduceable and less subject to minor instabilities. When other than ambient temperature tests are to be employed, the baffle plate is desirably manufactured from a material whose thermal expansion coefficient is approximately the same as that of the test specimen so that optimum clearance can be maintained between the workpiece and the baffle plate.

Further objects, features and advantages of this invention will become apparent from a consideration of the following description, the appended claims, and the accompanying drawing in which:

FIG. 1 is a vertical sectional view of the vibratory apparatus of this invention;

FIG. 2 is a transverse sectional view of the apparatus of this invention as seen from substantially the line 2—2 in FIG. 1;

FIG. 3 is a plan view of a workpiece surface that has been subjected to cavitation damage in apparatus of a type which did not provide for a uniform distribution of the damage over the surface; and FIG. 4 is a plan view of a workpiece surface that has been subjected to cavitation damage in the apparatus of this invention.

With reference to the drawing, the high frequency vibratory apparatus of this invention, indicated generally at 10 in FIG. 1, consists of the same basic components as the apparatus shown in the aforementioned Hammitt et al. patent except for the addition of the baffle means hereinafter described. Accordingly, the apparatus 10 will be only briefly described herein, the more detailed description in the patent being herein incorporated by reference.

The apparatus 10 consists generally of a high frequency transducer and horn assembly 12 mounted on the top cover 14 of a container 16 which is partially filled with a liquid 18 to a level indicated at 20. As shown in FIG. 1, the container 16 is formed with an outwardly flared conical top wall portion 26 which terminates in a radially outwardly extending flange 28 on which the cover 14 is mounted, by means such as bolts 30.

The transducer and horn assembly 12 consists of an elongated horn member or rod 32 which has a lower section 34 that is tapered along its length and terminates at its lower end in a rod section 36 of constant diameter. A transducer driver, indicated generally at 38, is connected to the upper end of the horn member 32 and a counterweight 40 is attached to the upper end of the driver 38. In the illustrated form of the invention, the driver 38 consists of a pair of piezoelectric crystal wafers 42 which are bonded to opposite sides of an aluminum spacer disk 44. An internal bolt 46, suitably insulated electrically, is secured to the counterweight 40, passes through the wafers 42 and the spacer 44 and is secured to the upper end of the horn member 32.

When high frequency alternating voltage, for example, a twenty kilocycle alternating voltage is applied to the electrode 52 and the ground connection 54 which are connected to the counterweight 40 and the spacer 44, respectively the crystal wafers 42 will contract periodically with the applied voltage and set up mechanical vibrations in the horn 32 of constant frequency. This results in a vibratory movement of the lower end of the horn 32 in an up and down direction.

As shown in FIG. 1, a test specimen or workpiece 60 is removably mounted on the lower end of the horn 32. In the illustrated embodiment of the invention, the workpiece 60 has a flat bottom surface 62 which is to be subjected to cavitation damage, and an integral threaded projection 63 threaded into a threaded opening 66 in the horn section 36. As shown in FIG. 1, the surface 62 is a planar surface and is thus easily machined, polished and examined microscopically.

A baffle plate 68 is mounted on the cover 14 of the container 16 so that the flat bottom surface 70 of the plate 68 is disposed substantially in the plane of the workpiece surface 62 prior to vibration of the workpiece 60. The baffle plate 68 has a central opening 72 (FIG. 2) in which the workpiece 60 is disposed. As shown in FIG. 4, the workpiece surface 62 has a boundary 64, which in this case is circular in shape, since the workpiece 60 is cylindrical. The opening 72 in the baffle plate 68 is of a size such that it is disposed in a closely spaced relation with the surface boundary 64.

In the illustrated embodiment of the invention, the baffle plate 68 is mounted on the lower ends of a plurality of support rods 74 which are secured at their upper ends to the container cover 14, but it is to be understood that other suitable means for supporting the baffle plate 68 in the position shown in FIG. 1 can be provided.

In the use of the apparatus 10 to provide for cavitation damage to the workpiece surface 62, a high frequency alternating voltage is applied to the electrodes 52 and 54 to provide for vibration of the workpiece surface 62. In actual practice, the surface 62 is moved up and down a total distance of approximately two mils. The spacing of the baffle plate 68 from the workpiece surface boundary 64 allows the workpiece 60 to move freely when being vibrated. In one embodiment of the invention, this spacing is on the order of 0.002 inch.

The movement of the workpiece 60 in the fluid 18 results in a rapid variation in local pressure on the surface 62 causing the periodic formation and collapse of an intense cavitation cloud. This results in an accelerated erosion of the surface 62 by virtue of the action thereon of the collapsing cloud. The closer the baffle plate 68 can be arranged relative to the surface boundary 64, the less chance the cavitation cloud will be perturbed, diminishing its erosion capabilities and uniformity. However the baffle plate 68 must be maintained in a spaced relation with the workpiece 60 or it will interfere with movement of the workpiece 60.

When the surface 62 has been exposed to the collapsing cloud for a sufficient period of time, the surface 62 will appear as shown in FIG. 4 which indicates that the surface 62 has been relatively uniformly damaged and that the structure of the damage is very fine in nature. When a workpiece 60a (FIG. 3) identical to the workpiece 60 is vibrated in the apparatus 10 with the baffle plate 68 removed, the exposed surface 62a on the workpiece 60a will appear substantially as shown in FIG. 3, which illustrates that the cavitation damage is non-uniform in nature and has some coarse characteristics.

For example, in one test wherein the fluid 18 was water at 70° F., and stainless steel workpieces 60 and 60a were employed, the weight loss in the specimen 60 during a twelve hour test was 46.7 milligrams, while after removal of the baffle plate 68, the weight loss of the specimen 60a was only 30.5 milligrams for a twelve hour test. Approximately 60% of the total area of the surface 62a was damaged while the damaged area of the surface 62 on the workpiece 60 was substantially 90%. Thus, the baffle plate 68 provides for increased and more uniform cavitation damage.

The baffle plate 68 can be formed of any desired material when the apparatus 10 is to be used for ambient temperature tests. When the tests are to be run at other than ambient temperatures, the baffle plate 68 is manufactured from a material whose coefficient of thermal expansion is substantially the same as that of the workpiece 60 so that optimum clearance is maintained between workpiece and baffle plate at all temperatures. In all cases, the diameter of the baffle plate is large compared to the diameter of the workpiece surface 62 so that the cavitation cloud is not perturbed.

From the above description, it is seen that this invention provides vibratory apparatus 10 capable of providing for an increased rate of cavitation damage accompanied by a uniform dispersion of this damage to thereby enable more accurate and easily repeatable test results. All of these desirable advantages are achieved by the simple expedient of adding the baffle plate 68 to the apparatus disclosed in the aforementioned U.S. Pat. No. 3,331,589.

It will be understood that the vibratory unit with baffle which is herein disclosed and described is presented for purposes of explanation and illustration and is not intended to indicate limits of the invention, the scope of which is defined by the following claims.

What is claimed is:

1. In vibratory apparatus which includes a container for liquid, a vibratable rod extending downwardly into said container, means operatively associated with said rod for vibrating said rod in a vertical direction, and a workpiece mounted on the lower end of said rod so that said workpiece has a surface disposed in a substantially horizontal plane and boundaries for said surface disposed in said plane, the improvement comprising baffle means mounted in said container and having a lower surface disposed substantially in said plane, said baffle means having an opening in which said workpiece is disposed and edges bounding said opening and disposed in a closely spaced relation with said workpiece boundary.

2. Vibratory apparatus according to claim 1 wherein said baffle means is a plate and said lower surface thereof is flat.

3. Vibratory apparatus according to claim 2 wherein the dimensions of said baffle plate in said plane are large compared to the dimensions of said workpiece in said plane.

4. Vibratory apparatus according to claim 3 wherein said baffle plate is constructed of a material having a coefficient of thermal expansion corresponding approximately to the coefficient of thermal expansion of the material from which said workpiece is formed.

References Cited

UNITED STATES PATENTS

| | | | |
|---|---|---|---|
| 281,906 | 7/1883 | Merritt | 259—116 |
| 2,068,913 | 1/1937 | Gregg. | |
| 2,499,203 | 2/1950 | Warren | 259—99 |
| 2,652,843 | 9/1953 | Schuchman et al. | 134—149 XR |
| 3,331,589 | 7/1967 | Hammitt et al. | 259—116 |

ROBERT L. BLEUTGE, Primary Examiner

U.S. Cl. X.R.
259—114; 134—184